Feb. 9, 1932.  C. W. BALKE  1,844,495
METHOD AND MEANS OF BUTT WELDING
Filed Oct. 13, 1928  2 Sheets-Sheet 2
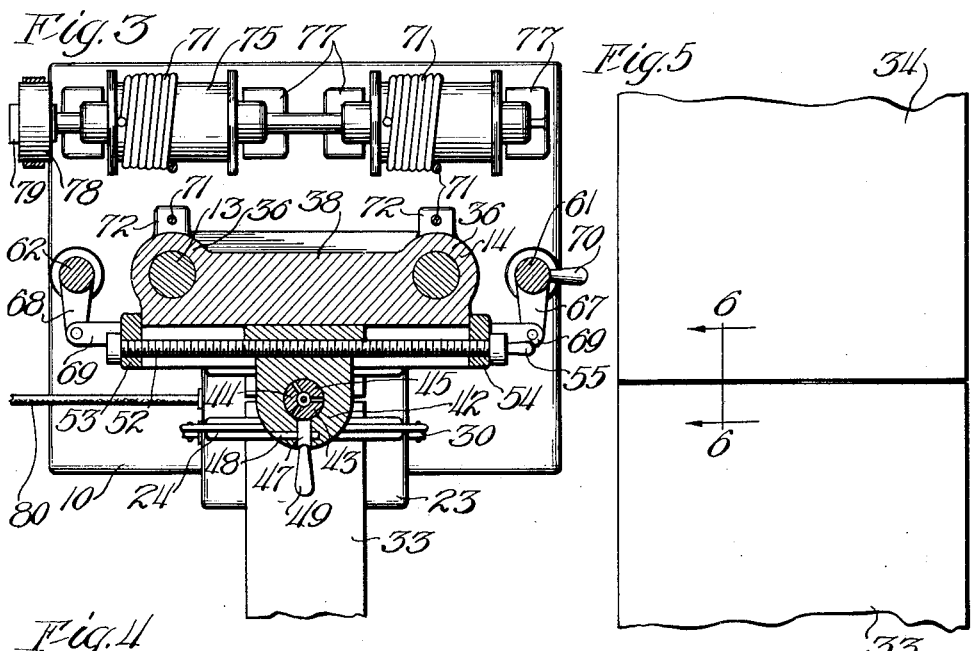
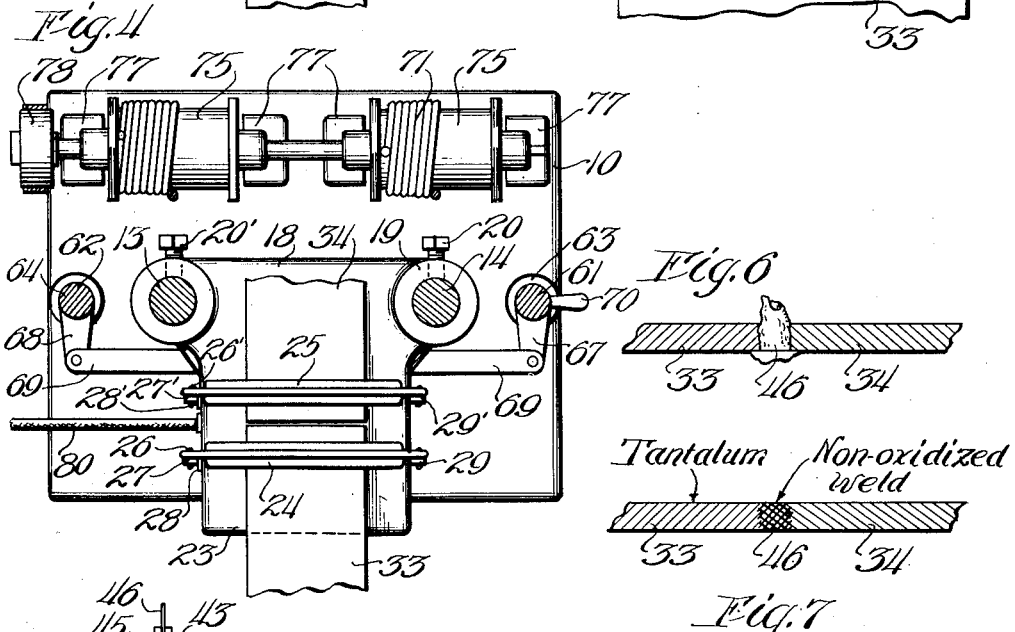
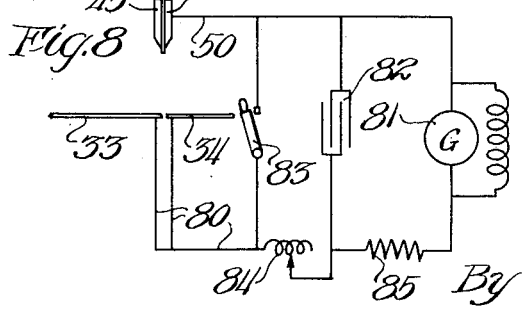
Inventor:
Clarence W. Balke
By Williams, Bradbury, McCaleb & Hinkle
Attys.

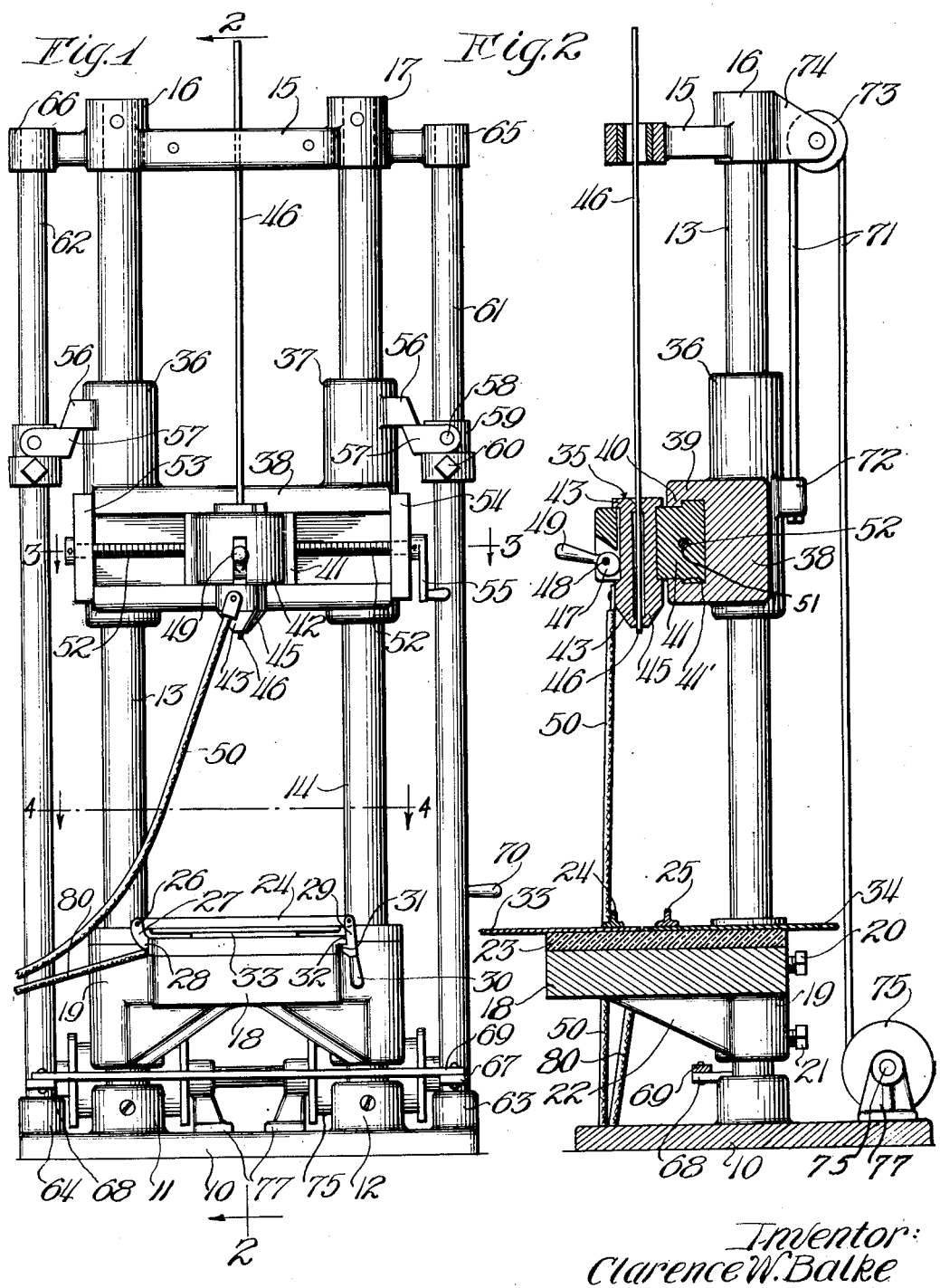

Patented Feb. 9, 1932

1,844,495

UNITED STATES PATENT OFFICE

CLARENCE W. BALKE, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK

METHOD AND MEANS OF BUTT-WELDING

Application filed October 13, 1928. Serial No. 312,310.

This invention relates to a method and means of butt-welding metals which are easily oxidized and which cannot therefore be readily welded by conventional means. More particularly, my invention relates to a method and means for welding tantalum.

Tantalum and other rare metals may be welded by conventional means, namely by mechanically cleaning adjacent surfaces, superimposing them and subjecting them to spot-welding or roller welding. The large amount of heat that necessarily accompanies this operation causes tantalum to form oxides and nitrides with gases in the air. The film so formed not only impairs the continuity of the joint and weakens it but it also renders the surface of the metal so brittle and hard that it cannot be rolled or worked. The object of this invention is to overcome these difficulties.

A further object is to provide an improved welded tantalum joint without the formation of oxides between the joined surfaces or on the surface of the joint.

A further object is to provide an electro-percussive welding process for butt-welding metal sheets or plates.

A further object is to provide improved apparatus for carrying out this process.

Other objects will be apparent as the detailed description of my invention proceeds.

In the accompanying drawings, which represent a preferred embodiment of my invention and in which like parts are designated by similar reference characters throughout the several figures, Fig. 1 is a front elevation of my improved welding apparatus with the impact member in elevated position.

Fig. 2 is a vertical section taken along the lines 2—2 of Fig. 1.

Fig. 3 is a horizontal section taken along the lines 3—3 of Fig. 1.

Fig. 4 is a horizontal section taken along the lines 4—4 of Fig. 1.

Fig. 5 is a detail showing tantalum strips partially welded.

Fig. 6 is a partial section along the lines 6—6 of Fig. 5 showing the weld before the extra metal is removed.

Fig. 7 is a similar section showing the final weld; and

Fig. 8 is a diagrammatic electrical circuit for supplying electrical discharge for my improved process.

The apparatus may be generally described as a means for holding metal sheets with their edges juxtaposed in the path of an impact member carrying a metal wire, either the metal plates or the impact member being movable so that a series of electro-percussive welds may be made along the seam to form a continuous non-oxidized joint.

Referring more particularly to Fig. 1, my apparatus consists of a base 10 provided with sockets 11 and 12 in which are secured slide rods 13 and 14. These rods are braced at their upper ends by a bracket 15 containing sockets 16 and 17 in which the rods may be secured by any suitable means.

A platform 18 is fixedly secured to rods 13 and 14 and is preferably reinforced by a collar 19, these elements being fixed on rods by set screws 20 and 21 respectively. The platform 18 may be integral with the supporting collar 19 and may be centrally braced by suitable flanges or brackets 22 which are also preferably integral with the platform and collar.

The upper surface of the platform is covered with an insulating plate 23, preferably a phenol formaldehyde condensation product. To this member (or to platform 18) are secured clamps 24 and 25 which are preferably reinforced metal strips pivoted at 26 to an arm 27 which is in turn secured by suitable fastening means 28 to the platform or platform cover. To the other end of the clamps is pivoted a locking element 29 provided with a suitable handle 30 and a shoulder 31 adapted to coact with a shoulder 32 on the platform or cover to securely lock the clamp in place. It is understood of course that any suitable clamp might be used for this purpose and that the structure hereinabove described is exemplary only.

Sheets 33 and 34 of tantalum or other metal to be welded are held with their edges closely juxtaposed upon the insulating surface of the platform by the above described clamping means. The edges preferably touch each other, although it is not essential to my process that the edges be true or that they exactly fit each other. In the particular embodiment of my invention herein described, the seam should lie in a plane parallel to the plane of the supporting rods 13 and 14 and should be spaced directly underneath the impact member, which will be hereinafter described.

Impact member 35 is carried by collars 36 and 37 slidable on rods 13 and 14 respectively. A cross arm 38 is integral with collars 36 and 37 and is provided with a slot formed by outwardly extending flanges 39 and inwardly extending flanges 40.

A block 41 is adapted to slide in the slot in cross arm 38, said block having shoulders 41′ adapted to fit against inwardly extending flanges 40 to hold the parts in rigid position. Block 41 carries a chuck support 42 which consists of three segments 43, 44 and 45 substantially 120 degrees each, mounted in an aperture in the support 42 and held therein by suitable flanges. A wire 46 may be threaded between the three segments of the chuck and may be tightly clamped in position by means of an offset cam 47 pivoted at 48 in a cut-away portion of the support, said cam being operated by a suitable handle 49 as shown in Fig. 2. The chuck is connected to one side of an electrical circuit, preferably by means of a wire 50 secured to segment 43 of the chuck.

The block 41 is provided with a threaded aperture 51 adapted to engage the threads on the screw 52, which is journaled in plates 53 and 54 forming the end of the slot in the cross arm. A handle 55 is fixed to one end of screw 52, as shown in Fig. 1, and by means of this arrangement the impact element, including the wire chuck and chuck support, may be moved laterally across the cross arm 38. A lug 56 is fixed to slidable collars 36 and 37 and is adapted to coact with a catch 57 pivoted on a pin 58 secured to collar 59, which is fixed by set screws 60 to the rotatable rods 61 and 62. These rods are journaled at their base in supports 63 and 64, and their upper ends are journaled in bearings 65 and 66 which are integral with reinforcing bracket 15.

Rods 61 and 62 are provided with offset arms 67 and 68 to which are pivoted a tie rod or link 69. A handle 70 on rotatable rod 61 provides a means for turning this rod for disengaging the lug 56 from the catch 57, the tie rod 69 simultaneously rotating rod 62 to release the corresponding lug and catch on that side. Cords or cables 71 are secured at one end to lugs 72 on collars 36 and 37 respectively, are trained over a pulley 73 mounted in a bracket 74 integral with element 15 and secured at the other end to drums 75 mounted on shafts 76 journaled in suitable bearings 77 on the base 10 (note Figs. 2, 3 and 4).

On one end of shaft 76 I provide a pulley 78 and a suitable clutch 79 whereby cross arm 38 together with the impact member may be elevated, the lugs 56 causing catches 57 to pivot on pins 58 in the upward movement. When these elements are in elevated position the clutch may be manually or automatically released whereby the cross arm and its associated members may fall freely in the next or welding step of the process, being released by a manipulating handle 70 to rotate rods 61 and 62. Metal plates 33 and 34 are connected to the electrical source by suitable wires 80.

The electrical circuit is diagrammatically shown in Fig. 8, wherein the source is a direct current generator 81 which charges a large capacity condenser 82. A switch 83 is provided for short circuiting the condenser and protecting the operator while the metals are being secured in the apparatus for welding. A variable inductance 84 is preferably included in the circuit between one terminal of the condenser 82 and the welding circuit to regulate the period of condenser discharge. A resistance 85 is included in a generator condenser circuit to prevent short circuiting of the source through the weld after the impact.

Electro-percussive welding has been used heretofore for joining the ends of small wires, and the electrical circuit employed herein is substantially the same as that heretofore used for this purpose. The problem of butt-welding tantalum and other metals of this general characteristic has remained unsolved, and I have found that by using a multiplicity of electro-percussive welding operations continuously along a seam a welded joint may be produced which is not oxidized and which is readily workable. In this process the impact element is first dropped in one or two places along the seam to tack the sheets together. The impact member is then moved to one edge of the joint and is dropped to form an electro-percussive welded spot. The wire is cut or broken off immediately above the weld, the impact element is again raised above the catch, the screw is rotated to move the impact member laterally a distance approximately equal to the diameter of the wire, and the impact element is again dropped to form a second electro-percussive weld. This process is repeated until a continuous weld is formed along the whole seam. The time of impact is so short and the force of impact is so great that the wire is driven completely between the two juxtaposed edges. The intense heat causes the adjacent edges together with the wire to become molten and to fuse together instantaneously with no chance for an oxide to be formed either between the surfaces or at either side thereof. When the weld is completed, the clamps 24 and 25 are removed and the surplus metal as illustrated in Fig. 6 is burnished away to leave a smooth joint as shown in Fig. 7.

While I have shown a preferred embodiment of my invention, it is understood that I am not limited to the details disclosed therein except as defined by the appended claims. The platform may be movable instead of the impact element, various shaped platforms may be used whereby two edges may be joined to form cylinders, etc., the impact advancing screw may be mechanically interconnected with the drums or pivoted catches whereby the spacing of impacts may be automatically accomplished, and various other modifications and equivalents may be employed, as will be evident to those skilled in the art. In the modification I have shown the platform top 23 of insulating material. I also contemplate the use of insulating material for block 42 and in fact I have obtained the best results by entirely insulating the slide rods from the support.

In the appended claims, the term "electro-percussive weld" is hereby defined as a weld formed by effecting percussive engagement of metal bodies and simultaneously applying heat of great intensity, preferably by condenser discharge.

I claim:

1. The method of butt-welding which comprises holding edges of metal plates juxtaposed and uniting them by a series of electro-percussive welds along the juxtaposed edges.

2. The method of butt-welding which comprises holding edges of metal plates juxtaposed, applying a third metal body between the edges by a percussive action and simultaneously therewith applying heat to form an electro-percussive weld, and repeating the process to form a series of welds along the juxtaposed edges to make a continuous seam.

3. Welding apparatus comprising means for holding edges of metal in juxtaposed position, an impact member, an electric condenser of large capacity connected to said impact member and to said metals, means for supplying energy to said condenser and means for directing said impact member toward said juxtaposed edges of metal.

4. In electro-percussive welding apparatus, a welding platform, an impact member, and means for laterally changing the relative position of the impact member with respect to the platform, means for operating said impact member, and means for simultaneously applying heat of great intensity.

5. In welding apparatus, means for holding edges of metals in juxtaposed position and means for effecting a plurality of electro-percussive welds along said edges whereby a continuous seam is produced.

6. In electric welding apparatus, means for holding edges of metals in juxtaposed position, means for causing percussive engagement between said edges and a wire, and means for simultaneously supplying heat of great intensity at the point of engagement.

7. In an electro-percussive welding machine, means for making a continuous seam weld including a lateral adjusting mechanism for causing impacts to occur successively along juxtaposed edges of metals being welded and means for supplying electric impulses of great intensity at the points of impact.

8. In combination, a support, slide rods, a platform associated therewith, clamping means on said platform for holding edges of metal in juxtaposed position, an impact element slidably mounted on said rods for movement toward and away from said support, and means for moving said impact member laterally with respect to said platform, and means for supplying heat of great intensity to the juxtaposed edges whereby electro-percussive welds may be closely spaced to form a continuous seam.

9. The method of butt welding which comprises holding edges of metal plates in substantially abutting position, causing percussive engagement between a wire and the abutting edges sufficient to force the wire into the seam formed by the abutting edges and into the metal of the edges, and simultaneously applying electric impulses of great intensity at the point of engagement.

10. The method of welding tantalum which comprises forming a continuous seam between juxtaposed portions of the metal by a plurality of electro-percussive welds.

11. The method of welding tantalum which comprises holding edges of tantalum plates juxtaposed, applying a third metal body between the edges by a percussive action and simultaneously therewith applying heat to form an electro-percussive weld, and repeating the process to form a series of welds along the juxtaposed edges to make a continuous seam.

12. The method of butt-welding tantalum which comprises holding edges of tantalum plates juxtaposed and uniting them by a series of electro-percussive welds along the juxtaposed sides.

13. The method of butt-welding which comprises holding edges of metal plates juxtaposed, forming an electro-percussive weld while simultaneously applying a third metal body to said juxtaposed edges, using the third metal body as one electrode and the metal as the other, and repeating the process to form a series of welds along the juxtaposed edges to make a continuous seam.

14. The method of butt-welding tantalum which comprises holding edges of tantalum plates in substantially abutting position, causing percussive engagement between a wire and the abutting edges sufficient to force the wire into the seam formed by the abutting edges and into the metal of the edges, and simultaneously applying electric impulses of great intensity at the point of engagement.

In witness whereof, I hereunto subscribe my name this 6th day of October, 1928.

CLARENCE W. BALKE.